US012755874B2

(12) United States Patent
Sun et al.

(10) Patent No.: US 12,755,874 B2
(45) Date of Patent: Oct. 6, 2026

(54) PROCESS FOR PRODUCING CABLE WITH INSULATION LAYER

(71) Applicants: Dow Global Technologies LLC, Midland, MI (US); Dow Silicones Corporation, Midland, MI (US)

(72) Inventors: Yabin Sun, Shanghai (CN); Gaoxiang Wu, Lake Jackson, TX (US); Colin LiPiShan, Lake Jackson, TX (US); Timothy J. Person, Collegeville, PA (US); Wenxin Zhang, Shanghai (CN); Kainan Zhang, Shanghai (CN); Jie Ji, Shanghai (CN)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 73 days.

(21) Appl. No.: 18/704,326

(22) PCT Filed: Dec. 17, 2021

(86) PCT No.: PCT/CN2021/139003

§ 371 (c)(1),
(2) Date: Apr. 24, 2024

(87) PCT Pub. No.: WO2023/108588

PCT Pub. Date: Jun. 22, 2023

(65) Prior Publication Data

US 2025/0125075 A1 Apr. 17, 2025

(51) Int. Cl.

| | |
|---|---|
| ***H01B 19/00*** | (2006.01) |
| ***C08J 3/24*** | (2006.01) |
| ***C08K 5/06*** | (2006.01) |
| ***C08K 5/54*** | (2006.01) |
| ***H01B 3/44*** | (2006.01) |
| ***H01B 17/60*** | (2006.01) |
| *C08K 5/14* | (2006.01) |
| *C08L 23/06* | (2006.01) |
| *H01B 13/06* | (2006.01) |

(52) U.S. Cl.

CPC ................ *H01B 19/00* (2013.01); *C08J 3/24* (2013.01); *C08K 5/06* (2013.01); *C08K 5/54* (2013.01); *H01B 3/441* (2013.01); *H01B 17/60* (2013.01); *C08J 2323/04* (2013.01); *C08K 5/14* (2013.01); *C08K 2201/012* (2013.01); *C08L 23/06* (2013.01); *C08L 2203/202* (2013.01); *H01B 13/06* (2013.01)

(58) Field of Classification Search

CPC ........ H01B 19/00; H01B 3/441; H01B 17/60; H01B 13/06; H01B 7/0009; H01B 7/02; C08J 3/24; C08J 2323/04; C08K 5/06; C08K 5/54; C08K 2201/012; C08K 5/5403; C08K 5/5419; C08K 5/14; C08L 23/0815; C08L 23/06; C08L 2203/202

See application file for complete search history.

(56) References Cited

U.S. PATENT DOCUMENTS

| | | | | |
|---|---|---|---|---|
| 4,803,244 | A | 2/1989 | Umpleby | |
| 9,557,405 | B2 | 1/2017 | Takahashi et al. | |
| 2015/0075839 | A1* | 3/2015 | Sun ...................... | C09D 123/06 427/120 |
| 2018/0142080 | A1 | 5/2018 | Sun et al. | |

FOREIGN PATENT DOCUMENTS

| | | | |
|---|---|---|---|
| DE | 3717971 | A1 | 12/1988 |
| JP | H11-130914 | A | 5/1995 |
| JP | 11130914 | A | 5/1999 |
| JP | 2014136729 | A | 7/2014 |

OTHER PUBLICATIONS

English Translation DE3717971; Rueckert; Kaiser Kabel GmbH; Published Dec. 8, 1988 (Year: 1988).*

* cited by examiner

*Primary Examiner* — Steven T Sawyer

(74) *Attorney, Agent, or Firm* — Boyle Fredrickson S.C.

(57) ABSTRACT

The present disclosure provides a process. In an embodiment, the process includes providing an initial cable core. The initial cable core includes (i) a conductor and (ii) an initial insulation layer. The initial insulation layer includes a crosslinkable polymeric composition composed of (a) an ethylene-based polymer composed of (1) ethylene monomer, (2) an optional α-olefin comonomer, and (3) an optional organosiloxane comonomer. The crosslinkable polymeric composition further includes (b) dicumyl peroxide (DCP), (c) an Si—H containing (AP) scavenger, (d) optional curing coagent, and (e) optional anti-oxidant. The process includes subjecting the initial cable core to a crosslinking procedure sufficient to crosslink the crosslinkable polymeric composition and form a cable core with a crosslinked insulation layer.

17 Claims, No Drawings

PROCESS FOR PRODUCING CABLE WITH INSULATION LAYER

BACKGROUND

Peroxide crosslinked ethylene-based polymer (XLPE) is widely used as an insulation material in industrial and municipal power transmission cables including both HVAC (high voltage alternating current) and HVDC (high voltage direct current). Direct current (DC) conductivity of XLPE is an important parameter for HVDC insulating materials where the electric field distribution across the cables as well as space charge build-up depend on conductivity. The peroxide (dicumyl peroxide, "DCP," for example) used for crosslinking creates byproducts, such as methane, acetophenone, alpha methylstyrene, and cumyl alcohol. The presence of acetophenone (AP) increases the conductivity of the insulation layer, to the detriment of the HVDC cable. In order to reduce the amount of AP in the insulation layer to an acceptable level, conventional HVDC cable production protocol typically requires (i) low DCP loading at the cost of crosslink density and/or much longer degassing time. It typically takes at least 30 days for the HVDC cable made from conventional XLPE to degas and diminish the acetophenone to suitable low level. However, lowering DCP loading during crosslinking is problematic as doing so reduces the thermal resistance of the insulation layer due to lower crosslink density and also reduces the maximum operating temperature of the HVDC cable to 70° C., whereas more efficient operating temperature for HVDC is required to be 90° C. or greater.

The art recognizes the need for processes in power cable production capable of reducing peroxide byproduct generation and increase crosslink density in the power cable insulation layer.

SUMMARY

The present disclosure provides a process. In an embodiment, the process includes providing an initial cable core. The initial cable core includes (i) a conductor and (ii) an initial insulation layer. The initial insulation layer includes a crosslinkable polymeric composition composed of (a) an ethylene-based polymer composed of (1) ethylene monomer, (2) an optional α-olefin comonomer, and (3) an optional organosiloxane comonomer. The crosslinkable polymeric composition further includes (b) dicumyl peroxide (DCP), (c) an Si—H containing (AP) scavenger, (d) optional curing coagent, and (e) optional anti-oxidant. The process includes subjecting the initial cable core to a crosslinking procedure sufficient to crosslink the crosslinkable polymeric composition and form a cable core with a crosslinked insulation layer.

The present disclosure provides a cable. In an embodiment, the cable includes a cable core. The cable core includes (i) a conductor and (ii) a crosslinked insulation layer. The crosslinked insulation layer is formed from a crosslinkable polymeric composition composed of (a) an ethylene-based polymer composed of (1) ethylene monomer, (2) an optional α-olefin comonomer, and (3) an optional organosiloxane comonomer. The crosslinkable polymeric composition further includes (b) dicumyl peroxide (DCP), (c) an Si—H containing (AP) scavenger, (d) optional curing coagent, and (e) optional anti-oxidant.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges of 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" or "ethylene polymer" is a polymer that contains a majority amount of polymerized ethylene based on the weight of the polymer and, optionally, may comprise at least one comonomer. Ethylene-based polymers typically comprise at least 50 mole percent (mol %) units derived from ethylene (based on the total amount of polymerizable monomers).

A "hydrocarbon" (or, "hydrocarbyl" a "hydrocarbyl group") is a compound containing only hydrogen atoms and carbon atoms.

The terms "heterohydrocarbon," ("heterohydrocarbyl," or heterohydrocarbyl group") and similar terms, as used herein, refer to a respective hydrocarbon, in which at least one carbon atom is substituted with a heteroatom group (for example, Si, O, N or P).

The terms "substituted hydrocarbon," (or "substituted hydrocarbyl," or "substituted hydrocarbyl group") refers to a hydrocarbon in which one or more hydrogen atoms is/are independently substituted with a heteroatom group. The terms "substituted heterohydrocarbon," ("substituted heterohydrocarbyl," or "substituted heterohydrocarbyl group") and similar terms, as used herein, refer to a respective heterohydrocarbon in which one or more hydrogen atoms is/are independently substituted with a heteroatom group.

An "interpolymer" is a polymer prepared by the polymerization of at least two different types of monomers. The generic term interpolymer thus includes copolymers (employed to refer to polymers prepared from two different types of monomers), and polymers prepared from more than two different types of monomers.

An "olefin-based polymer" or "polyolefin" is a polymer that contains a majority mole percent polymerized olefin monomer (based on total amount of polymerizable monomers), and optionally, may contain at least one comonomer. Nonlimiting examples of olefin-based polymer include ethylene-based polymer and propylene-based polymer. Representative polyolefins include polyethylene, polypropylene, polybutene, polyisoprene and their various interpolymers.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," as defined hereinafter. Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains a majority amount of polymerized propylene based on the weight of the polymer and, optionally, may comprise at least one comonomer. Propylene-based polymers typically comprise at least 50 mole percent (mol %) units derived from propylene (based on the total amount of polymerizable monomers).

Test Methods

Density is measured in accordance with ASTM D792, Method B (g/cc or g/cm$^3$).

Differential Scanning Calorimetry (DSC)

Differential Scanning Calorimetry (DSC) is used to measure $T_m$, $T_c$, $T_g$ and crystallinity in ethylene-based (PE) polymer samples and propylene-based (PP) polymer samples. Each sample (0.5 g) was compression molded into a film, at 5000 psi, 190° C., for two minutes. About 5 to 8 mg of film sample was weighed and placed in a DSC pan. The lid was crimped on the pan to ensure a closed atmosphere. Unless otherwise stated, the sample pan was placed in a DSC cell, and then heated, at a rate of 10° C./min, to a temperature of 180° C. for PE (230° C. for PP). The sample was kept at this temperature for three minutes. Then the sample was cooled at a rate of 10° C./min to −90° C. for PE (−60° C. for PP), and kept isothermally at that temperature for three minutes. The sample was next heated at a rate of 10° C./min, until complete melting (second heat). Unless otherwise stated, melting point ($T_m$) and the glass transition temperature ($T_g$) of each polymer were determined from the second heat curve, and the crystallization temperature ($T_c$) was determined from the first cooling curve. The respective peak temperatures for the $T_m$ and the $T_c$ were recorded. The percent crystallinity can be calculated by dividing the heat of fusion ($H_f$), determined from the second heat curve, by a theoretical heat of fusion of 292 J/g for PE (165 J/g for PP), and multiplying this quantity by 100 (for example, % cryst.=(Hf/292 J/g)×100 (for PE)). In DSC measurements, it is common that multiple $T_m$ peaks are observed, and here, the highest temperature peak as the $T_m$ of the polymer is recorded.

Gel Permeation Chromatography

The chromatographic system consisted of a PolymerChar GPC-IR (Valencia, Spain) high temperature GPC chromatograph, equipped with an internal IR5 infra-red detector (IR5). The autosampler oven compartment was set at 160° Celsius, and the column compartment was set at 150° Celsius. The columns were four AGILENT "Mixed A" 30 cm, 20-micron linear mixed-bed columns. The chromatographic solvent was 1,2,4-trichloro-benzene, which contained 200 ppm of butylated hydroxytoluene (BHT). The solvent source was nitrogen sparged. The injection volume used was 200 microliters, and the flow rate was 1.0 milliliters/minute.

Calibration of the GPC column set was performed with 21 narrow molecular weight distribution polystyrene standards, with molecular weights ranging from 580 to 8,400,000, and which were arranged in six "cocktail" mixtures, with at least a decade of separation between individual molecular weights. The standards were purchased from Agilent Technologies. The polystyrene standards were prepared at "0.025 grams in 50 milliliters" of solvent, for molecular weights equal to, or greater than, 1,000,000, and at "0.05 grams in 50 milliliters" of solvent, for molecular weights less than 1,000,000. The polystyrene standards were dissolved at 80 degrees Celsius, with gentle agitation, for 30 minutes. The polystyrene standard peak molecular weights were converted to polyethylene molecular weights using Equation 1 (EQ1) (as described in Williams and Ward, J. Polym. Sci., Polym. Let., 6, 621 (1968)):

$$M_{polyethylene} = A \times (M_{polyetyrene})^B, \quad \text{(EQ 1)}$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects, such that linear homopolymer polyethylene standard is obtained at 120,000 Mw. The total plate count of the GPC column set was performed with decane (prepared at "0.04 g in 50 milliliters" of TCB, and dissolved for 20 minutes with gentle agitation.) The plate count (Equation 2, EQ2) and symmetry (Equation 3, EQ3) were measured on a 200 microliter injection according to the following equations:

$$\text{Plate Count} = 5.54 * \left( \frac{(RV_{Peak\ Max}}{\text{Peak Width at } \frac{1}{2} \text{ height}} \right)^2, \quad \text{(EQ 2)}$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \quad \text{(EQ 3)}$$

where RV is the retention volume in milliliters, and the peak width is in milliliters, Peak max is the maximum position of the peak, one tenth height is 1/10 height of the peak maximum, and where rear peak refers to the peak tail at later retention volumes than the peak max, and where front peak refers to the peak front at earlier retention volumes than the peak max. The plate count for the chromatographic system should be greater than 18,000, and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged, septa-capped vial, via the PolymerChar high temperature autosampler. The samples were dissolved for two hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1. Equations 4-6 (EQ4-EQ6) are as follows:

$$Mn_{(GPC)} = \frac{\sum^{i} IR_i}{\sum^{i} \left(IR_i / M_{polyethylene_i}\right)}, \quad \text{(EQ 4)}$$

$$Mw_{(GPC)} = \frac{\sum^{i} \left(IR_i * M_{polyethylene_i}\right)}{\sum^{i} IR_i}, \quad \text{(EQ 5)}$$

and $$Mz_{(GPC)} = \frac{\sum^{i} \left(IR_i * M_{polyethylene_i}^{\,2}\right)}{\sum^{i} \left(IR_i * M_{polyethylene_i}\right)}. \quad \text{(EQ 6)}$$

In order to monitor the deviations over time, a flowrate marker (decane) was introduced into each sample, via a micropump controlled with the PolymerChar GPC-IR system. This flowrate marker (FM) was used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate (effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system, based on a flow marker peak, the effective flowrate (with respect to the narrow standards calibration) was calculated as Equation. 7: Flowrate(effective)=Flowrate (nominal)*(RV(FM Calibrated)/RV(FM Sample)) (EQ7). Processing of the flow marker peak was done via the PolymerChar GPCOne™ Software. Acceptable flowrate correction is such that the effective flowrate should be within +/−0.7% of the nominal flowrate.

MDR test was conducted on MDR2000 (Alpha Technologies) at 180° C. for 20 minutes while monitoring change in torque according to ASTM D5289-12, Standard Test Method for Rubber Property—Vulcanization Using Rotorless Cure Meters. Designate the lowest measured torque value as "ML", expressed in deciNewton-meter (dN-m). As curing or crosslinking progresses, the measured torque value increases, eventually reaching a maximum torque value. Designate the maximum or highest measured torque value as "MH", expressed in dN-m. All other things being equal, the greater the MH torque value, the greater the extent of crosslinking. Determine the T90 crosslinking time as being the number of minutes required to achieve a torque value equal to 90% of the difference MH minus ML (MH-ML), i.e., 90% of the way from ML to MH. The shorter the T90 crosslinking time, i.e., the sooner the torque value gets 90% of the way from ML to MH, the faster the curing rate of the test sample. Conversely, the longer the T90 crosslinking time, i.e., the more time the torque value takes to get 90% of the way from ML to MH, the slower the curing rate of the test sample.

Melt Index

The melt index (or "12") of an ethylene-based polymer is measured in accordance with ASTM D-1238, condition 190° C./2.16 kg (melt index 110 at 190° C./10.0 kg). The 110/12 was calculated from the ratio of 110 to the 12. The melt flow rate MFR of a propylene-based polymer is measured in accordance with ASTM D-1238, condition 230° C./2.16 kg.

Nuclear Magnetic Resonance (NMR) Characterization of Terpolymers

For $^{13}C$ NMR experiments, samples were dissolved, in 10 mm NMR tubes, in tetrachloroethane-$d_2$ (with or without 0.025 M $Cr(acac)_3$). The concentration was approximately 300 mg/2.8 mL. Each tube was then heated in a heating block set at 110° C. The sample tube was repeatedly vortexed and heated to achieve a homogeneous flowing fluid. The $^{13}C$ NMR spectrum was taken on a BRUKER AVANCE 600 MHz spectrometer, equipped with a 10 mm C/H DUAL cryoprobe. The following acquisition parameters were used: 60 seconds relaxation delay, 90 degree pulse of 12.0 μs, 256 scans. The spectrum was centered at 100 ppm, with a spectral width of 250 ppm. All measurements were taken without sample spinning at 110° C. The $^{13}C$ NMR spectrum was referenced to "74.5 ppm" for the resonance peak of the solvent. For a sample with Cr, the data was taken with a "7 seconds relaxation delay" and 1024 scans.

For $^{1}H$ NMR experiments, each sample was dissolved, in 8 mm NMR tubes, in tetrachloroethane-$d_2$ (with or without 0.001 M $Cr(acac)_3$). The concentration was approximately 100 mg/1.8 mL. Each tube was then heated in a heating block set at 110° C. The sample tube was repeatedly vortexed and heated to achieve a homogeneous flowing fluid. The $^{1}H$ NMR spectrum was taken on a BRUKER AVANCE 600 MHz spectrometer, equipped with a 10 mm C/H DUAL cryoprobe. A standard single pulse $^{1}H$ NMR experiment was performed. The following acquisition parameters were used: 70 seconds relaxation delay, 90 degree pulse of 17.2 μs, 32 scans. The spectrum was centered at 1.3 ppm, with a spectral width of 20 ppm. All measurements were taken, without sample spinning, at 110° C. The $^1$H NMR spectrum was referenced to "5.99 ppm" for the resonance peak of the solvent (residual protonated tetrachloroethane). For a sample with Cr, the data was taken with a "16 seconds relaxation delay" and 128 scans.

DETAILED DESCRIPTION

The present disclosure provides a process. In an embodiment, the process includes providing an initial cable core. The initial cable core includes (i) a conductor, (ii) an initial insulation layer. The initial insulation layer includes a crosslinkable polymeric composition composed of a) an ethylene-based polymer composed of (1) ethylene monomer, (2) an optional α-olefin comonomer, and (3) an optional organosiloxane comonomer. The crosslinkable polymer composition further includes (b) dicumyl peroxide (DCP), (c) an Si—H containing acetophenone (AP) scavenger, (d) optional curing coagent, and (e) optional anti-oxidant. The process includes subjecting the initial cable core to a crosslinking procedure sufficient to crosslink the crosslinkable polymeric composition and form a cable core with a crosslinked insulation layer.

1. Initial Cable Core

The process includes providing an initial cable core. The initial cable core includes (i) a conductor, (ii) a first polymeric semiconductive layer, and (iii) an initial insulation layer composed of a crosslinkable polymeric composition. A "conductor," as used herein, is one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic. A "cable," as used herein, is at least one wire or optical fiber within a sheath, e.g., an insulation covering or a protective outer jacket. Typically, a cable is two or more wires or two or more optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Alternating current cables can be prepared according to the present disclosure, which can be low voltage, medium voltage, high voltage, or extra-high voltage cables. Further, direct current cables can be prepared according to the present disclosure, which can include high or extra-high voltage cables. Insulated electrical conductors normally comprise a conductive core covered by an insulation layer. The conductive core can be solid or braided (for example, a bundle of threads). Some insulated electrical conductors may also contain one or more additional elements, such as a semiconductor layer (or layers) and/or a protective cover (for example, coiled wire, tape or sheath). Examples are coated metal wires and electrical cables, including those for use in low voltage ("LV",>0 to <5 kilovolts (kV) electricity distribution/transmission applications), medium voltage ("MV", 5 to <69 kV), high voltage ("HV", 69 to 230 kV) and extra-high voltage ("EHV",>230 kV). Power cable assessments can use AEIC/ICEA standards and/or IEC test methods.

The initial cable core includes a first crosslinkable polymeric semiconductive layer and an optional second crosslinkable polymeric semiconductive layer. In an embodiment, the first crosslinkable polymeric semiconductive layer is interposed between the insulation layer composed of the crosslinkable polymeric composition and the conductor, while the second crosslinkable polymeric semiconductive layer surrounds the insulation layer composed of the crosslinkable polymeric composition. Alternatively, the initial insulation layer directly contacts the conductor. The first crosslinkable semiconductive layer and the second crosslinkable polymeric semiconductive layer can be composed of the same composition or be composed of different compositions. Additionally, each crosslinkable polymeric semiconductive layer may be crosslinked and, as such, may initially include crosslinkable polymeric compositions.

Polymers suitable for use in the first crosslinkable polymeric semiconductive layer and/or the second crosslinkable polymeric semiconductive layer include, but are not limited to, ethylene-based polymers (such as those described above), ethylene ethylacrylate copolymer ("EEA"), ethylene butylacrylate copolymer ("EBA"), ethylene vinyl acetate copolymer ("EVA"), polyolefin elastomers, and combinations of two or more thereof.

In an embodiment, a conductive filler is present in the first crosslinkable polymeric semiconductive layer and/or the second crosslinkable polymeric semiconductive layer. The conductive filler is present in an amount ranging from 1 to 50 wt % based on the total weight of the respective crosslinkable semiconductive layer, include conductive carbon blacks, conductive carbons (e.g., carbon fiber, carbon nanotubes, graphene, graphites, and expanded graphite platelets), and metal particles. Optional additives include antioxidants, stabilizers, and processing aids.

2. Insulation Layer

The initial cable core includes an initial insulation layer composed of a crosslinkable polymeric composition. The crosslinkable polymeric composition includes a) an ethylene-based polymer composed of (1) ethylene monomer, (2) an optional α-olefin comonomer and/or (3) an optional organosiloxane comonomer. The crosslinkable polymeric composition further includes (b) dicumyl peroxide (DCP), (c) a Si—H containing AP scavenger, (d) optional curing coagent, and (e) optional antioxidant.

The ethylene-based polymer in the crosslinkable polymeric composition of the initial insulation layer is composed of (1) ethylene monomer, (2) an optional α-olefin comonomer (such as an ethylene/$C_4$-$C_8$ α-olefin copolymer) and/or (3) an optional organosiloxane comonomer.

In an embodiment, the ethylene-based polymer is an ethylene homopolymer with (i) a density from 0.90 g/cc to 0.93 g/cc, or from 0.91 g/cc to 0.92 g/cc; and/or (ii) an MI from 0.1 g/10 min to 10.0 g/10 min, or from 0.5 g/10 min to 5.0 g/10 min or from 1.0 g/10 min to 3.0 g/10 min.

Nonlimiting examples of suitable ethylene homopolymer include LDPE DXM-446 and LDPE 5051, available from Dow Inc.

In an embodiment, the ethylene-based polymer is a telechelic ethylene-based polymer or a monochelic ethylene-based polymer. A "telechelic ethylene-based polymer" is copolymer of ethylene and α-olefin comonomer (such as an ethylene/$C_4$-$C_8$ α-olefin copolymer) of Formula I: $A^1L^1L^2A^2$, wherein:

$L^1$ is ethylene/α-olefin copolymer, (such as an ethylene/$C_4$-$C_8$ α-olefin copolymer); note, $L^1$ (divalent) is bonded to $A^1$ and $L^2$;

$A^1$ is selected from the group consisting of the following:

a) a vinyl group, b) a vinylidene group of the formula $CH_2{=}C(Y^1)$—, c) a vinylene group of the formula $Y^1CH{=}CH$—, d) a mixture of a vinyl group and a vinylene group of the formula $Y^1CH{=}CH$—, e) a mixture of a vinyl group and a vinylidene group of the formula $CH_2{=}C(Y^1)$—, f) a mixture of a vinylidene group of the formula $CH_2{=}C(Y^1)$— and a vinylene group of the formula $Y^1CH{=}CH$—, and g) a mixture of a vinyl group, a vinylidene group of the formula $CH_2{=}C(Y^1)$—, and a vinylene group of the formula $Y^1CH{=}CH$—;

$Y^1$ at each occurrence, independently, is a $C_1$ to $C_{30}$ hydrocarbyl group;

$L^2$ is a $C_1$ to $C_{32}$ hydrocarbylene group; and $A^2$ is a hydrocarbyl group comprising a hindered double bond.

A "monochelic ethylene-based polymer" is copolymer of ethylene and α-olefin comonomer (such as an ethylene/$C_4$-$C_8$ α-olefin copolymer) of Formula II: $A^1L^1$, wherein:

$L^1$ is $L^1$ is ethylene/α-olefin copolymer, such as an ethylene/$C_4$-$C_8$ α-olefin copolymer; note, $L^1$ (monovalent) is bonded to $A^1$;

$A^1$ is selected from the group consisting of the following:

a) a vinyl group, b) a vinylidene group of the formula $CH_2{=}C(Y^1)$—, c) a vinylene group of the formula $Y^1CH{=}CH$—, d) a mixture of a vinyl group and a vinylene group of the formula $Y^1CH{=}CH$—, e) a mixture of a vinyl group and a vinylidene group of the formula $CH_2{=}C(Y^1)$—, f) a mixture of a vinylidene group of the formula $CH_2{=}C(Y')$— and a vinylene group of the formula $Y^1CH{=}CH$—, and g) a mixture of a vinyl group, a vinylidene group of the formula $CH_2{=}C(Y^1)$—, and a vinylene group of the formula $Y^1CH{=}CH$—; and Y1 at each occurrence, independently, is a $C_1$ to $C_{30}$ hydrocarbyl group.

Telechelic polymers and monochelic polymers are disclosed in International Publications WO 2020/140058 and WO 2020/140067, each of which is incorporated by reference herein. Telechelic polymers and monochelic polymers are interchangeably referred to as "unsaturated POE" or "UPOE."

In an embodiment, the ethylene-based polymer in the crosslinkable polymeric composition of the initial insulation layer is an ethylene/organosiloxane copolymer. The ethylene/organosiloxane copolymer includes (i) units derived from ethylene, (ii) from 0.01 wt % to 0.5 wt % units derived from a comonomer, and (iii) optionally units derived from a termonomer. The comonomer is a monocyclic organosiloxane (MOCOS) of Formula (3)

$$[R^1, R^2SiO_{2/2}]_n$$

wherein n is an integer greater than or equal to 3, each $R^1$ is independently a $(C_2$-$C_4)$alkenyl or a $H_2C{=}C(R^{1a})$—$C({=}O)$—O—$(CH_2)_m$— wherein $R^{1a}$ is H or methyl;

m is an integer from 1 to 4; and each $R^2$ is independently H, $(C_1$-$C_4)$alkyl, phenyl, or $R^1$.

The ethylene-based polymer with monocyclic organosiloxane (MOCOS) of Formula (3) is interchangeably referred to as "ethylene/MOCOS copolymer."

In an embodiment, in an embodiment, MOCOS of Formula (3) is 2,4,6-trimethyl-2,4,6-trivinyl-cyclotrisiloxane, "$(D^{Vi})_3$" (CAS No. 3901-77-7) having Structure (B) below:

Structure (B)

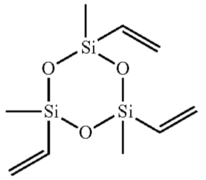

In an embodiment, MOCOS of Formula (3) is 2,4,6,8-tetramethyl-2,4,6,8-tetravinyl-cyclotetrasiloxane, "$(D^{Vi})_4$" (CAS No. 2554 Jun. 5), having Structure (C) below;

Structure (C)

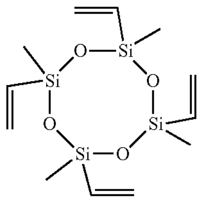

In an embodiment, MOCOS of Formula (3) is 2,4,6,8,10-pentamethyl-2,4,6,8,10-pentavinyl-cyclopentasiloxane, $(D^{Vi})_5$.

The MOCOS comonomer of Formula (3) is present in the ethylene-based polymer in an amount from 0.01 wt % to 2 wt %, or from 0.01 wt % to 0.5 wt %, or from 0.05 wt % to 0.45 wt %, or from 0.1 wt % to 0.40 wt %, or from 0.3 wt % to 0.5 wt %, or from 0.15 wt % to 0.30 wt %, or from 0.05 wt % to 0.15 wt %. Weight percent is based on total weight of the ethylene-based polymer composition, namely, the ethylene/MOCOS copolymer.

The crosslinkable polymeric composition in the initial insulation layer also includes from 0.1 wt % to 2.4 wt %, or from 0.5 wt % to 2.0 wt %, or from 0.7 wt % to 1.5 wt %, or from 0.7 wt % to 1.2 wt % dicumyl peroxide (DCP). Weight percent is based on total weight of the crosslinkable polymeric composition.

The crosslinkable polymeric composition in the initial insulation layer includes an Si—H containing AP scavenger. An "Si—H containing AP scavenger," as used herein, is an organic silicon compound of Formula 4:

Formula 4

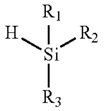

wherein $R_1$, $R_2$ and $R_3$ are the same or different, each $R_1$, $R_2$ and $R_3$ is individually selected from H, a substituted hydrocarbyl, an unsubstituted hydrocarbyl, a substituted heterohydrocarbyl, an unsubstituted heterohydrocarbyl or siloxane. The Si—H containing (AP) scavenger is a separate and distinct component to the ethylene-based polymer. In the crosslinkable polymeric composition, the Si—H containing (AP) scavenger is not a comonomer to the ethylene-based polymer. Non-limiting samples of suitable the Si—H containing (AP) scavenger of Formula 4 include s1) through s20) below:

(s1)

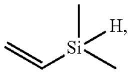

(s2)

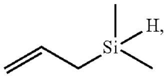

(s3)

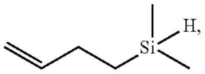

(s4)

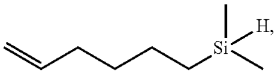

(s5)

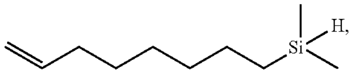

(s6)

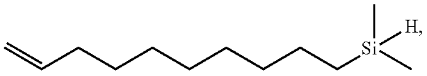

(s7)

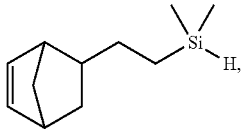

(s8)

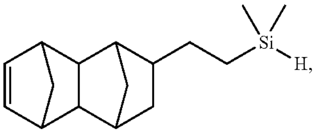

(s9)

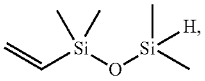

(s10)

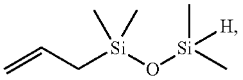

(s11)

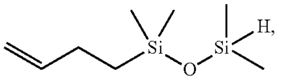

(s12)

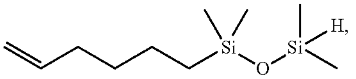

(s13)

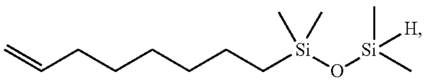

(s14)

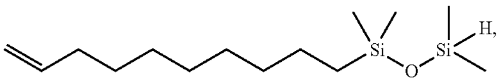

-continued (S15)

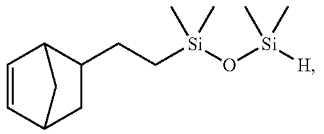

(s16)

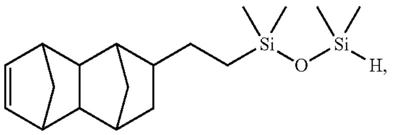

(s17)

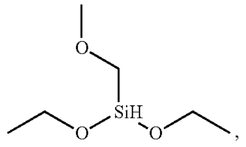

(s18)

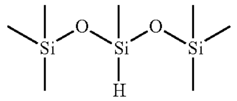

(s19)

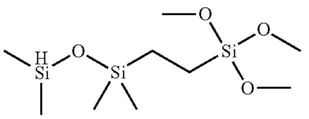

(s20)

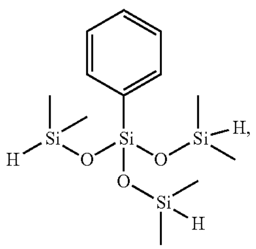

and combinations thereof.

In an embodiment, the Si—H containing (AP) scavenger includes polyhedral oligomeric silsesquioxane containing SiH group, and/or inorganic silica containing SiH group, such as dimethylhydrogensiloxy modified silica, for example.

The crosslinkable polymeric composition may optionally include a curing coagent. Nonlimiting examples of suitable curing cogent include triallyl isocyanurate ("TAIC"), triallyl cyanurate ("TAC"), triallyl trimellitate ("TA™"), N2,N2,N4,N4,N6,N6-hexaallyl-1,3,5-triazine-2,4,6-triamine ("HATATA"), triallyl orthoformate, pentaerythritol triallyl ether, triallyl citrate, and triallyl aconitate, α-methyl styrene dimer ("AMSD"), acrylate-based coagents such as trimethylolpropane triacrylate ("TMPTA"), trimethylolpropane trimethylacrylate ("TMPTMA"), ethoxylated bisphenol A dimethacrylate, 1,6-hexanediol diacrylate, pentaerythritol tetraacrylate, dipentaerythritol pentaacrylate, tris (2-hydroxyethyl) isocyanurate triacrylate, and propoxylated glyceryl triacrylate, vinyl-based coagents such as polybutadiene having a high 1,2-vinyl content, trivinyl cyclohexane ("TVCH") 4,6-trimethyl-2,4,6-trivinyl-cyclotrisiloxane (VD3), 2,4,6,8-tetramethyl-2,4,6,8-tetravinyl-cyclotetrasiloxane(VD4). 2,4,6,8,10-pentamethyl-2,4,6,8,10-pentavinyl-cyclopentasiloxane, VD5. When present, the curing coagent is present in an amount from greater than 0 wt % to 5 wt %, or from 0.1 wt % to 2.5 wt %, or from 0.2 wt % to 2 wt %, or from 0.3 wt % to 1.5 wt %, or from 0.4 wt % to 1.0 wt %, based on total weight of the crosslinkable polymeric composition.

The crosslinkable polymeric composition includes an optional anti-oxidant. When present in the crosslinkable polymeric composition, the antioxidant is an organic molecule that inhibits oxidation or a collection of oxygen molecules. The antioxidant works to provide antioxidant properties to the polyolefin composition and/or cross-linked polyolefin product. Nonlimiting examples of suitable anti-oxidant include 2,6-di-tert-butyl-4-methylphenol; 2-(tert-butyl)-4,6-dimethylphenol; 2-(tert-butyl)-4-ethyl-6-methylphenol; 2-(tert-butyl)-4-isopropyl-6-methylphenol; 2,4-di-tert-butyl-6-methylphenol; 2,4,6-tri-tert-butylphenol; 2,6-di-tert-butyl-4-isopropylphenol; 2,6-di-tert-butyl-4-ethylphenol; 2,6-di-tert-butylphenol; 2-(tert-butyl)-6-methylphenol; 2,6-diisopropyl-4-methylphenol; 2-isopropyl-4,6-dimethylphenol; 4-ethyl-2-isopropyl-6-methylphenol; 2,4-diisopropyl-6-methylphenol; 4-(tert-butyl)-2-isopropyl-6-methylphenol; 2-(tert-butyl)-6-isopropyl-4-methylphenol; 2-(tert-butyl)-4-ethyl-6-isopropylphenol; 2-(tert-butyl)-4,6-diisopropylphenol; 2,4-di-tert-butyl-6-isopropylphenol; 2-(tert-butyl)-4-methyl-6-(tert-pentyl)phenol; 4-methyl-2,6-di-tert-pentylphenol; 2,4-dimethyl-6-(tert-pentyl)phenol; 2-ethyl-4-methyl-6-(tert-pentyl)phenol; 2-(tert-butyl)-6-ethyl-4-methylphenol; 2-ethyl-6-isopropyl-4-methylphenol; 2,6-diethyl-4-methylphenol; octadecyl 3-(3,5-di-tert-butyl-4-hydroxyphenyl) propionate (IRGANOX 1076); pentaerythritol tetrakis-[3-[3,5-di-tert-butyl-4-hydroxyphenyl]propionate (IRGANOX 1010); 1,3,5-tris(3,5-di-tert-butyl-4-hydroxybenzyl)-1,3,5-triazine-2,4,6(1H,3H,5H)-trione (IRGANOX 3114); (1,3,5-trimethyl-2,4,5-tris(3',5'-ditert-butyl)-4'-hydroxybenzyl)-benzene (IRGANOX 1330); hexamethylene bis[3-(3,5-di-tert-butyl-4-hydroxyphenyl)propionate (IRGANOX 259); benzenepropanoic acid, 3,5-bis(1,1-dimethyl-ethyl)-4-hydroxy-C7-C9 branched alkyl esters (IRGANOX 1135); 3,5-bis(1,1-dimethylethyl)-4-hydroxybenzenepropanoic acid thiodi-2,1-ethanediyl ester (IRGANOX 1035); N,N'-(hexane-1,6-diyl)bis[3-(3,5-di-tert-butyl-4-hydroxyphenyl) propanamide](IRGANOX 1098); 1,2-bis(3,5-di-tert-butyl-4-hydroxy-hydrocinnamoyl)hydrazine (IRGANOX 1024); 2,6-di-tert-butyl-4-(4,6-bis(octylthio)-1,3,5-triazin-2-ylamino) phenol (IRGANOX 565); ethylene bis (oxyethylene) bis-(3-(5-tert-butyl-4-hydroxy-m-tolyl)-propionate) (IRGANOX 245); 4,6-bis(octylthiomethyl)-o-cresol (IRGANOX 1520); 4,6-bis(dodecylthiomethyl)-o-cresol (IRGANOX 1726); 3,5-tris(4-(tert-butyl)-3-hydroxy-2,6-dimethylbenzyl)-1,3,5-triazinane-2,4,6-trione (CYANOX 1790); phenol, 2-(5-chloro-2H-bentotriazol-2-yl)-6-(1,1-dimethylethyl)-4-methyl (TINUVIN 326); phenol, 2-(2H-benzotriazol-2-yl)-4-methyl (TINUVIN P); 2-(2H-benzotriazol-2-yl)-4,6-ditertpentylphenol (TINUVIN 328); 2-(2H-benzotriazol-2-yl)-4-(1,1,3,3-tetramethylbutyl)phenol (TINUVIN 329); phenol, 2-(2H-benzotriazol-2-yl)-4-methyl-6-dodecyl (TINUVIN 571); 2,2'-methylenebis(6-(2H-benzotriazol-2-yl)-4-(1,1,3,3-tetramethylbutyl)phenol) (TINUVIN 360); 2-(4,6-diphenyl-1,3,5-triazin-2-yl)-5-[(hexyl)oxy]-phenol (TINUVIN 1577); 2-(2H-benzotriazol-2-yl)-4,6-bis(1-methyl-1-phenylethyl)phenol (TINUVIN 234); 4,4"-thiobis(2-tert-butyl-5-methylphenol (TBM-6); 3,4-dihydro-2,5,7,8-tetramethyl-2-(4,8,12-trimethyltridecyl)-2H-1-benzopyran-6-ol (IRGANOX E201), and combinations thereof. When present, the anti-oxidant present in an amount from greater than 0 wt % to 5 wt %, or from 0.01 wt % to 2 wt %, or from 0.05 wt % to 1 wt %, or from 0.1 wt % to 0.5 wt %, or from 0.15 wt % to 0.3 wt %, based on total weight of the crosslinkable polymeric composition.

The crosslinkable polymeric composition may also contain other additives including, but not limited to, processing aids, fillers, carbon black, nanoparticles, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators. When present the additive(s), other than fillers, are typically used in an amount ranging from 0.001 wt % to 10 wt %, or from 0.01 wt % to 7 wt %, or from 0.05 wt % to 5 wt %, or from 0.1 wt % to 3 wt %, based on total weight of the crosslinkable polymeric composition. When the filler is present, the filler is present in an amount from 1 wt % to 50 wt %, or from 2 wt % to 40 wt %, or from 5 wt % to 30 wt %, or from 10 wt % to 20 wt % based on the total weight of the crosslinkable polymeric composition. Nonlimiting examples of suitable filler include clays, precipitated silica and silicates, fumed silica, calcium carbonate, ground minerals, aluminum trihydroxide, magnesium hydroxide, and carbon blacks with typical arithmetic mean particle sizes larger than 15 nanometers.

3. Crosslinking Procedure

The process includes subjecting the initial cable core to a crosslinking procedure sufficient to crosslink the crosslinkable polymeric composition and form a cable core with a crosslinked insulation layer. The initial cable core containing inner and outer semiconductive and insulation layers can be prepared with various types of extruders, e.g., single or twin screw types. A description of a conventional extruder can be found in U.S. Pat. No. 4,857,600, incorporated by reference herein. A nonlimiting example of co-extrusion and an extruder can be found in U.S. Pat. No. 5,575,965, incorporated by reference herein. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If the extruder has more than one barrel, the barrels are connected in series. The length to diameter ratio of each barrel is in the range of from 15:1 to 30:1.

In an embodiment, the cable core is prepared from a continued vulcanization line composed of single extruder, vulcanization tube and cooling tube.

Following extrusion, the resulting initial cable core is subjected to, or otherwise undergoes, a crosslinking procedure to crosslink the crosslinkable polymeric composition in the initial insulation layer. The initial cable core passes into a heated cure zone downstream of the extrusion die. The heated cure zone is maintained at a temperature in the range from 150° C. to 400° C., or from 160° C. to 350° C. or from 170° C. to 300° C. The heated cure zone is heated by pressurized steam, or is inductively heated with pressurized nitrogen gas. The crosslinking procedure provides a crosslinked insulation layer from the crosslinkable polymeric composition.

In an embodiment, one or both of the first (inner) polymeric semiconductive layer and/or second (outer) polymeric semiconductive layer is crosslinked during the crosslinking procedure.

In an embodiment, following the crosslinking procedure, the process includes cooling the cable core with crosslinked insulation layer to ambient temperature to form a cooled cable core with a crosslinked insulation layer. The term "ambient temperature," as used herein, is a temperature from 20° C. to 24° C., or from 21° C. to 23° C.

The crosslinking procedure forms or otherwise creates dicumyl peroxide decomposition byproducts (or "DCP decomposition byproducts") in the crosslinked insulation layer. The term "dicumyl peroxide decomposition byproducts" denotes decomposition products formed during the crosslinking step and/or during the curing step, and/or during the cooling step, by decomposition and reaction of the dicumyl peroxide. The DCP decomposition byproducts include cumyl alcohol (CA), acetophenone (AP), methane, alpha methyl styrene, and combinations thereof. The Si—H containing (AP) scavenger react, suppresses, or otherwise quenches, acetophenone that is generated during the crosslinking procedure and/or any subsequent curing and/or cooling.

Following the crosslinking procedure, the process includes cooling the cable core with crosslinked insulation layer to ambient temperature to form a cooled cable core with a crosslinked insulation layer having an $R_{AP/CA}$ value less than 0.57. The amount of acetophenone and cumyl alcohol each is determined by way of headspace gas chromatography/flame ionization detection as set forth in the Examples section below. The term "cooled cable core with a crosslinked insulation layer," as used herein, is the cable core with the crosslinked insulation layer at a point in time immediately after the crosslinking procedure, specifically from 1 minute to 60 minutes after the cable core is cooled to, or otherwise reaches, ambient temperature; the "cooled cable core with a crosslinked insulation layer," is the post-crosslinked cable core from 1 minute to 60 minutes of arrival at ambient temperature and prior to a degassing procedure. A "cooled crosslinked XLPE plaque" (and/or a "cooled crosslinked POE plaque") as used herein, is a crosslinked ethylene-based polymer plaque used to replicate the cooled cable core with the crosslinked insulation layer in the Examples section (below), the cooled crosslinked XLPE plaque (and/or the cooled crosslinked POE plaque) at a point in time immediately after the crosslinking procedure, specifically from 1 minute to 60 minutes after the plaque is cooled to, or otherwise reaches, ambient temperature; the "cooled crosslinked XLPE (and/or "the cooled crosslinked POE plaque")," is the post-crosslinked plaque from 1 minute to 60 minutes of arrival at ambient temperature and prior to a degassing procedure. The $R_{AP/CA}$ value demonstrates the AP reduction in the present process. Lowering the ratio of AP to CA (i.e., the smaller the $R_{AP/CA}$ value) leads to lowering AP concentration given the same DCP loading.

In an embodiment, the cooled cable core with a crosslinked insulation layer is "composition (C)," and a "similar composition (SC)" is defined "as an identical composition to composition (C) except (SC) does not contain component (c), the Si—H containing (AP) scavenger." The composition (C) has an $R_{AP/CA}$ value, "$R_{AP/CA}$ (C)," and composition (SC) has an $R_{AP/CA}$ value (SC), "$R_{AP/CA}$(SC)." The composition (C) has a Reduction in $R_{AP/CA}$, or "Ri$R_{AP/CA}$," that is least 2.0% greater than the $R_{AP/CA}$ (SC) as determined by Formula 5 below:

Formula 5

$$\text{Reduction in } R_{AP/CA}\ \% = [(R_{AP/CA}(C) - R_{AP/CA}(SC)) / R_{AP/CA}(SC)] \times 100\%.$$

In an embodiment, the cooled cable core with a crosslinked insulation layer, composition (C), has a Reduction in $R_{AP/CA}$ that is from greater than or equal to 2.0% to less than or equal to 35%, or from greater than or equal to 5% to less than or equal to 30%, or from greater than or equal to 10% to less than or equal to 25%, or from greater than or equal to 10% to less than or equal to 20%.

In an embodiment, the process includes degassing the cooled cable core with a crosslinked insulation layer at a temperature from 50° C. to 80° C. from to reduce the amount of acetophenone to less than 1000 ppm in the crosslinked insulation layer with greater than 2%, or greater than 5% or greater than 10% or greater than 15% or greater than 20% or greater than 30% or greater than 35% or greater than 40% or greater than 45% degassing time reduction.

4. Cable

The present disclosure provides a cable. In an embodiment, the cable includes a cable core. The cable core is composed of (i) a conductor and (ii) a crosslinked insulation layer. The crosslinked insulation layer is formed from a crosslinkable polymeric composition composed of a) an ethylene-based polymer composed of (1) ethylene monomer, (2) an optional organosiloxane comonomer, and/or (3) an optional organosiloxane comonomer. The crosslinkable polymeric composition further includes b) dicumyl peroxide (DCP), and an Si—H containing (AP) scavenger, and (c) an Si—H containing (AP) scavenger, (d) optional curing coagent, and (e) optional anti-oxidant.

It is understood that the DCP is consumed during crosslinking to form the crosslinked insulation layer of the cable. In the crosslinked insulation layer of the cable, the Si—H containing (AP) scavenger is selected from the group consisting of (s1) through (s20) below (s1)

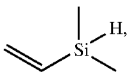

(s2)

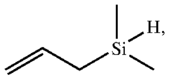

(s3)

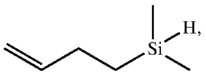

(s4)

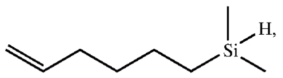

(s5)

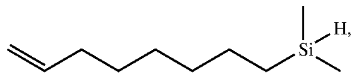

(s6)

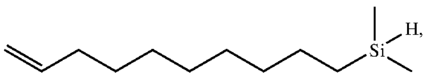

(s7)

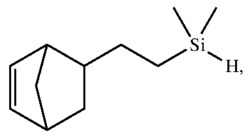

-continued (s8)

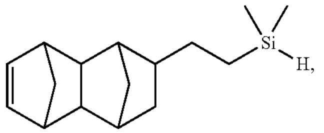

(s9)

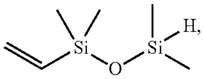

(s10)

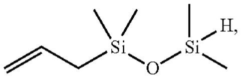

(s11)

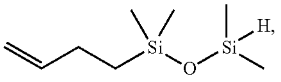

(s12)

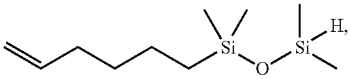

(s13)

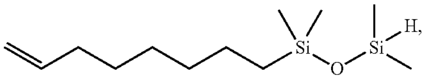

(s14)

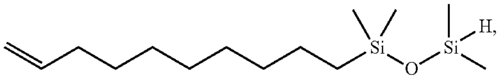

(s15)

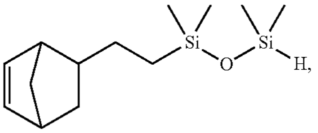

(s16)

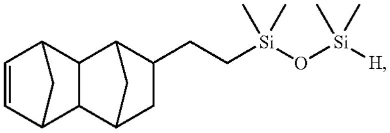

(s17)

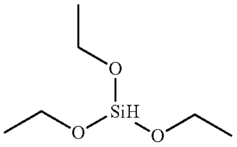

, (s18)

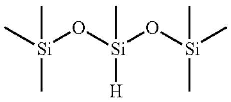

(s19)

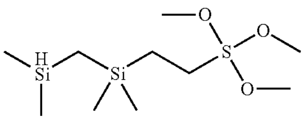

-continued (s20)

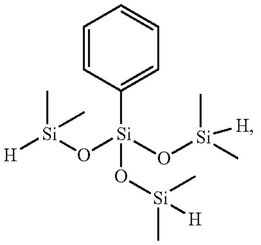

and combinations thereof.

In an embodiment, the cable includes the cable core with the crosslinked insulation layer composed of from 95 wt % to 99.9 wt % of an ethylene homopolymer, and from 0.1 wt % to 2.0 wt %, or from 0.2 wt % to 1.5 wt %, or from 0.3 wt % to 1.0 wt %, or from 0.4 wt % to 0.8 wt % of the Si—H containing (AP) scavenger. Weight percent is based on total weight of the crosslinked insulation layer. In a further embodiment, the crosslinked insulation layer includes from 0.1 wt % to 2 wt %, or from 0.2 wt % to 1.5 wt %, or from 0.3 wt % to 1 wt %, or from 0.4% to 0.8 wt % of the curing coagent. It is understood that the ethylene-homopolymer, Si—H containing (AP) scavenger and optional curing agent amount to 100 wt % of the crosslinked insulation layer.

In an embodiment, the cable includes the cable core with the crosslinked insulation layer composed of from 95 wt % to 99.9 wt % of a telechelic ethylene/$C_4$-$C_8$ α-olefin copolymer, and from 0.1 wt % to 2.0 wt %, or from 0.2 wt % or from 1.5 wt %, or from 0.3 wt % to 1.0 wt %, or from 0.4 wt % to 0.8 wt % of the Si—H containing (AP) scavenger. Weight percent is based on total weight of the crosslinked insulation layer. In an further embodiment, the crosslinked insulation layer includes from 0.1 wt % to 2.0 wt %, or from 0.2 wt % to 1.5 wt %, or from 0.3 wt % to 1 wt %, or from 0.4% to 0.8 wt % of the curing coagent. It is understood that the telechelic ethylene/$C_4$-$C_8$ α-olefin copolymer, Si—H containing (AP) scavenger and optional curing agent amount to 100 wt % of the crosslinked insulation layer.

In an embodiment, the cable includes the cable core with the crosslinked insulation layer composed of from 95 wt % to 99.9 wt % of a monochelic ethylene/$C_4$-$C_8$ α-olefin copolymer, and from 0.1 wt % to 2.0 wt %, or from 0.2 wt % or from 1.5 wt %, or from 0.3 wt % to 1.0 wt %, or from 0.4 wt % to 0.8 wt % of the Si—H containing (AP) scavenger. Weight percent is based on total weight of the crosslinked insulation layer. In an further embodiment, the crosslinked insulation layer includes from 0.1 wt % to 2.0 wt %, or from 0.2 wt % to 1.5 wt %, or from 0.3 wt % to 1.0 wt %, or from 0.4 wt % to 0.8 wt % of the curing coagent. It is understood that the monochelic ethylene/$C_4$-$C_8$ α-olefin copolymer, Si—H containing (AP) scavenger and optional curing agent amount to 100 wt % of the crosslinked insulation layer.

In an embodiment, the cable includes the cable core with the crosslinked insulation layer composed of from 95 wt % to 99.9 wt % of an ethylene/organosiloxane copolymer, and from 0.1 wt % to 2.0 wt %, or from 0.2 wt % or from 1.5 wt % or from 0.3 wt % to 1.0 wt %, or from 0.4 wt % to 0.8 wt % of the Si—H containing (AP) scavenger. The ethylene/organosiloxane copolymer is any ethylene/MOCOS copolymer as previously disclosed herein. Weight percent is based on total weight of the crosslinked insulation layer. In a further embodiment, the crosslinked insulation layer includes from 0.1 wt % to 2.0 wt %, or from 0.2 wt % to 1.5 wt %, or from 0.3 wt % to 1.0 wt %, or from 0.4 wt % to 0.8 wt % of the curing coagent. It is understood that the ethylene/organosiloxane copolymer, Si—H containing (AP) scavenger and optional curing agent amount to 100 wt % of the crosslinked insulation layer.

In an embodiment, the crosslinked insulation layer directly contacts the conductor. The term "directly contacts" refers to a layer configuration whereby the crosslinked insulation layer is located immediately adjacent to the conductor and no intervening layers or no intervening structures are present between the conductor and the crosslinked insulation layer.

In an embodiment, the cable includes the cable core with a first crosslinked polymeric semiconductive layer disposed between, or otherwise interposed between, the crosslinked insulation layer and the conductor. The first crosslinked polymeric semiconductive layer surrounds the conductor, and the crosslinked insulation layer surrounds the first crosslinked semiconductive layer. In a further embodiment, a second crosslinked polymeric semiconductive layer surrounds the crosslinked insulation layer. The first crosslinked polymeric semiconductive layer and the second crosslinked polymeric semiconductive layer can be composed of the same composition or can be composed of different compositions as previously disclosed herein.

In an embodiment, the cable includes the cooled cable core, i.e., the cable core immediately after crosslinking. The cooled cable core includes the crosslinked insulation layer having decomposition byproducts selected from the group consisting of cumyl alcohol (CA), acetophenone (AP), methane, alpha methyl styrene, and combinations thereof. The crosslinked insulation layer of the cooled cable core has an AP/CA ratio less than 0.57 at a time from 1 minute after the crosslinking procedure and being cooled to ambient temperature to 60 minutes after the crosslinking procedure and being cooled to ambient temperature and prior to a degassing procedure.

In an embodiment, the cable includes the cooled cable core with a crosslinked insulation layer is identified as composition (C). A similar composition, "(SC)," (as previously defined herein) is a composition identical composition to (C) except (SC) does not contain component (c), the Si—H containing (AP) scavenger. The composition (C) has an $R_{AP/CA}$(C) and the composition (SC) has an $R_{AP/CA}$(SC). The composition (C) has a Reduction in $R_{AP/CA}$, or "Ri$R_{AP/CA}$" that is least 2.0% greater than $R_{AP/CA}$ (SC) as determined by Formula 5 below:

Formula 5

$$\text{Reduction in } R_{AP/CA}\ \% = [(R_{AP/CA}(C) - R_{AP/CA}(SC)) / R_{AP/CA}(SC)] \times 100\%.$$

In an embodiment, the cooled cable core with a crosslinked insulation layer, composition (C), has a Reduction in $R_{AP/CA}$ that is from greater than or equal to 2.0% to less than or equal to 50%, or from greater than or equal to 5% to less than or equal to 40%, or from greater than or equal to 10% to less than or equal to 30%, or from greater than or equal to 10% to less than or equal to 20%.

By way of example, and not limitation, some embodiments of the present disclosure will now be described in detail in the following examples.

1. Materials

Materials used in the comparative samples (CS) and inventive examples (IE) are provided in Table 1A-1C below.

TABLE 1A

| LDPE | | | |
|---|---|---|---|
| LDPE | Density, g/cc | MI (2.16 kg, 190° C.), | Vinyl D4 comonomer content, wt % |
| LDPE-1 (DXM-446) | 0.92 | 2.3 | 0 |
| LDPE-2 (505i) | 0.92 | 2.2 | 0 |
| Polyethylene-VD4 copolymer-2 (0.15%) | 0.92 | 3.5 | 0.15 |
| Polyethylene-VD4 copolymer-3 (0.3%) | 0.92 | 3.5 | 0.3 |
| Polyethylene-VD4 copolymer-4 (0.5%) | 0.92 | 2.9 | 0.5 |
| Polyethylene-VD4 copolymer-11 (0.08%) | 0.92 | 3.5 | 0.08 |

TABLE 1B

| Unsaturated POE (u-POE) | | | | | | | |
|---|---|---|---|---|---|---|---|
| | Density, g/cc | MI (2.16 kg, 190° C.), | Vinyl per $10^6$ C. | Vinylidene per $10^6$ C. | Trissub per $10^6$ C. | Vinylene per $10^6$ C. | VCH per $10^6$ C. |
| UPOE1 (Telechelic ethylene/octene copolymer) | 0.87 | 9.6 | 241 | 125 | 22 | 57 | 282 |
| UPOE2 (Monochelelic ethylene/octene copolymer) | 0.87 | 10.5 | 223 | 121 | 35 | 67 | 0 |

TABLE 1C

| Name | Structure/properties | Source |
|---|---|---|
| DCP Dicumyl peroxide | Organic Peroxide $C_{18}H_{22}O_2$ CAS No. 80-43-3 | Farida |

TABLE 1C-continued

| Name | Structure/properties | Source |
| --- | --- | --- |
| SiH-1<br>Tri-ethoxysilane, | 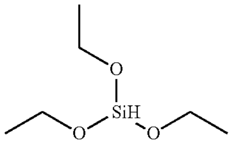<br>tri ethoxyl silane | TCl Shanghai |
| SiH-2<br>1,1,1,3,5,5,5-heptamethyltrisiloxane | 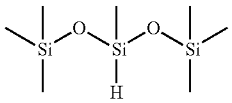<br>1,1,1,3,5,5,5-heptamethyltrisiloxane | TCl Shanghai |
| SiH-3<br>1-(2-(Trimethoxysilyl)ethyl)-1,1,3,3-tetramethyldisiloxane (CAS 137407-65-9) | 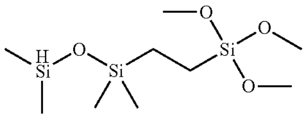<br>1-(2-(Trimethoxysilyl)ethyl)-1,1,3,3-tetramethyldisiloxane | Commercially available in Macklin Biochemical Co |
| SiH-4<br>3-((dimethylsilyl)oxy)-1,1,5,5-tetramethyl-3-phenyltrisiloxane | 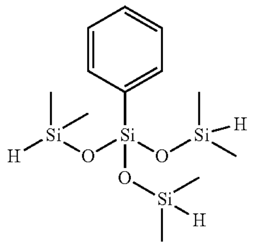<br>3-((dimethylsilyl)oxy)-1,1,5,5-tetramethyl-3-phenyltrisiloxane | TCl Shanghai |
| SiH-5<br>7-Octenyldimethylsilane | 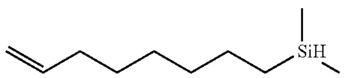<br>7-Octenyldimethylsilane | Gelest |
| TAIC<br>Triallyl isocyanurate | Curing Coagent<br>$C_{12}H_{15}N_3O_3$<br>CAS No. 1025-15-6 | Farida |
| TBM-6 | antioxidant<br>4,4'-Thiobis(6-tert-butyl-m-cresol)<br>$C_{22}H_{30}O_2S$<br>CAS No. 96-69-5 | Lowinox |

2. Calibration Curve Set Up for AP and CA Measurement 2.1: Preparation of Crosslinked Blank Sheet without AP and CA (Luperox 101 Will not Generate AP and CA)

a. 1 wt % Luperox 101 was soaked into POE blank sheet at 50° C. for 6 hours (hr). 1 wt % Luperox 101 was soaked into LDPE blank sheet at 70° C. for 6 hr.

b. The POE blank sheet and the LDPE blank sheet each is compression molded at 180° C. to prepare cross-linked two respective plaques, each plaque having a 1 mm thickness.

c. Each plaque is degassed in a vacuum oven at 70° C. for 1 day.

2.2: Crosslinked POE Calibration Sample and XLPE Calibration Sample Preparation a. 1 gram (g) sample is cut from a crosslinked POE blank or XLPE blank sheet and placed into a 20 milliliter (mL) headspace vial b. 0.005 g AP standard chemical was injected into the headspace vial containing the 1 g POE or XLPE sample to prepare the calibration standard. The headspace vial was then sealed with a crimp cap and is hereafter referred as "the calibration sample."

c. 0.005 g CA standard chemical was injected into the headspace vial containing the 1 g POE/XLPE sample to prepare the calibration standard. The headspace vial was then sealed with a crimp cap and is hereafter referred as "the calibration sample."

2.3: Load the Calibration Sample into HSGC with the Condition in the Table 1 for Analysis to Get the Correlation Between the Peak Area from HSGC and AP or CA Concentration in Calibration Sample.

TABLE 2A

| | |
|---|---|
| Instrument | Agilent 6890N Gas Chromatography system |
| Column | DB-WAX column (123-7033UI 30 m × 0.32 mm ID × 0.5 μm film) |
| Carrier flow | 2.0 mL/min constant flow Helium carrier gas |
| Oven | 50° C., hold 2 min<br>15° C./min ramp to 220° C., hold 8 min<br>Total run time: 21.3 min |
| Injection | Headspace |
| Inlet | Injector temp = 250° C.<br>Split ratio: 20:1 |
| Detector | FID<br>Temperature: 250° C.<br>H2 flow: 40 mL/min<br>Air flow: 400 mL/min<br>Makeup flow: 25 mL/min |
| Headspace instrument | Agilent 7697A headspace system |
| HS oven temperature | 150° C. |
| HS loop temperature | 160° C. |
| HS transfer line temperature | 170° C. |
| HS vial equilibration | 30 min |
| HS injection duration | 1.0 min |
| Loop equilibration time | 0.1 min |
| GC cycle time | 33 min |

Then put this loaded mold into a hot press machine (LabTech).

b. Preheating at 120'C for 10 minutes.
c. Venting for 8 times and 0.2 s for each.
d. Close the platens to apply 15 MPa pressure to mold for 20 minutes. Meanwhile increase the temperature to 182° C. within 6.5 minutes.
e. Keep a continued 15 Mpa on the mold and cooling to 24° C.
f. Take out the mold from machine.

3.2 Headspace Gas Chromatography (GC) Sample Preparation a. Remove the cured plaque with two PET films adhered on both sides from mold
b. Peel off the PET film quickly.
c. Cut out two sheets of the plaque's center area (around 1 g), and put them into two headspace GC vials, then seal the vials immediately.
d. Weigh the sealed GC headspace vial, and the sample weight could be calculated by the difference between the empty vial and the vial with sample.

4. AP and CA Measurement

The sealed headspace vial with 1 g plaque sample was transferred into a headspace autosampler to condition at 150° C. for 30 minutes (min). Then, an aliquot of 1 ml gas sample in the headspace vial was injected and directly analyzed with GC/FID (gas chromatography/flame ionization detector). The GC oven was programmed from 50° C. (2 min) to 220° C. (8 min) at 15° C. min-1. The FID temperature was at 250° C. with hydrogen flow rate at 40 mL min-1, air flow rate at 400 mL min-1 and nitrogen flow rate at 25 mL min-1. The inlet was operated at 250° C. in split mode at a ratio of 50:1, and the separation column was a 30 m×0.32 mm i.d.×0.50 μm DB-WAX capillary column with 2 mL min-1 flow rate of helium carrier gas.

5. Calculation

The concentrations of acetophenone and cumyl alcohol were calculated according to following formula in Table 2B below.

TABLE 2B

| 1) AP or CA in POE* matrix | 2) AP or CA in crosslinked insulation layer (XLPE**) |
|---|---|
| $RF_{POE, Std} = A_{POE, Std}/W_{POE, Std}$ | $RF_{XLPE, Std} = A_{XLPE, Std}/W_{XLPE, Std}$ |
| $RF_{POE, S} = RF_{POE, Std} * W_{POE, blk}/W_{POE, S}$ | $RF_{XLPE, S} = RF_{XLPE, Std} * W_{XLPE, blk}/W_{POE, S}$ |
| $Conc._{POE, S}$ (ppm) = $1000*A_{POE, S}/RF_{POE, S}/W_{POE, S}$ | $Conc._{XLPE, S}$ (ppm) = $1000*A_{XLPE, S}/RF_{XLPE, S}/W_{XLPE, S}$ |
| where | where |
| $RF_{POE, Std}$: Response factor of AP or CA in POE blank | $RF_{XLPE, Std}$: Response factor of AP or CA in POE blank |
| $RF_{POE, s}$: Response factor of AP or CA in POE sample | $RF_{XLPE, S}$: Response factor of AP or CA in POE sample |
| $A_{POE, Std}$: Peak area of AP or CA in POE blank | $A_{XLPE, Std}$: Peak area of AP or CA in POE blank |
| $A_{POE, S}$: Peak area of AP or CA in POE sample | $A_{XLPE, S}$: Peak area of AP or CA in POE sample |
| $W_{POE, blk}$: Weight of POE blank | $W_{XLPE, blk}$: Weight of POE blank |
| $W_{POE, Std}$: Weight of AP or CA in POE blank | $W_{XLPE, Std}$: Weight of AP or CA in POE blank |
| $W_{POE, S}$: Weight of POE sample | $W_{XLPE, S}$: Weight of POE sample |
| $Conc._{POE, S}$: Concentration of AP or CA in POE sample | $Conc._{XLPE, S}$: Concentration of AP or CA in POE sample |

*POE refers to a cooled crosslinked POE plaque,

**XLPE refers to a cooled crosslinked XLPE plaque

3. Sample Preparation for AP and CA Measurement 3.1 Compression Molding to Prepare Crosslinked Plaques from Example Compounds a. Put about 30 g of example compounds in pellets form into a 1-mm thickness mold between two PET films.

By way of example, Table 2C provides calculations for (i) AP and (ii) CA for CS-2, IE-10, and IE-11. Two specimens are taken for each sample of CS-2, IE-10, and IE-1. The final AP value and the final CA value is the average of number of these two specimens. The $R_{AP/CA}$ value is the final AP value divided by the final CA value for each sample.

TABLE 2C

| #1 | CS-2 AP | CS-2 CA | IE-10 AP | IE-10 CA | IE-11 AP | IE-11 CA |
|---|---|---|---|---|---|---|
| | Specimen 1 | | | | | |
| $A_{XLPE,\ Std}$ | 8222.8 | 8222.8 | 8222.8 | 8222.8 | 8222.8 | 8222.8 |
| $A_{XLPE,\ S}$ | 4850.4 | 8346.7 | 3361.7 | 8919.7 | 3306.9 | 9047.1 |
| $W_{XLPE,\ blk}$ | 0.9917 g | 0.9917 g | 0.9917 g | 0.9917 g | 0.9917 g | 0.9917 g |
| $W_{XLPE,\ Std}$ | 5.15 mg | 5.15 mg | 5.15 mg | 5.15 mg | 5.15 mg | 5.15 mg |
| $W_{XLPE,\ S}$ | 0.9369 g | 0.9369 g | 0.8958 g | 0.8958 g | 0.9037 g | 0.9037 g |
| $RF_{XLPE,\ Std}$ | 8222.8/5.15 = 1597 | 8222.8/5.15 = 1597 | 8222.8/5.15 = 1597 | 8222.8/5.15 = 1597 | 8222.8/5.15 = 1597 | 8222.8/5.15 = 1597 |
| $RF_{XLPE,\ S}$ | 1597*0.9917/ 0.9369 = 1690 | 1597*0.9917/ 0.9369 = 1690 | 1597*0.9917/ 0.8958 = 1768 | 1597*0.9917/ 0.8958 = 1768 | 1597*0.9917/ 0.9037 = 1752 | 1597*0.9917/ 0.9037 = 1752 |
| $Conc._{XLPE,\ S}$ (ppm) | 1000*4850.4/ 1690/0.9369 = 3063 ppm | 1000*8346.7/ 1690/0.9369 = 5271 ppm | 1000*3361.7/ 1768/0.8958 = 2123 ppm | 1000*8919.7/ 1768/0.8958 = 5633 ppm | 1000*3306.9/ 1752/0.9037 = 2088 ppm | 1000*9047.1/ 1752/0.9037 = 5714 ppm |

**XLPE refers to a crosslinked plaque

TABLE 2D

| #2 | CS-2 AP | CS-2 CA | IE-10 AP | IE-10 CA | IE-11 AP | IE-11 CA |
|---|---|---|---|---|---|---|
| | Specimen 2 | | | | | |
| $A_{XLPE,\ Std}$ | 8222.8 | 8222.8 | 8222.8 | 8222.8 | 8222.8 | 8222.8 |
| $A_{XLPE,\ S}$ | 4927.3 | 8509.3 | 3327.6 | 8796.4 | 3359.0 | 9195.2 |
| $W_{XLPE,\ blk}$ | 0.9917 g | 0.9917 g | 0.9917 g | 0.9917 g | 0.9917 g | 0.9917 g |
| $W_{XLPE,\ Std}$ | 5.15 mg | 5.15 mg | 5.15 mg | 5.15 mg | 5.15 mg | 5.15 mg |
| $W_{XLPE,\ S}$ | 0.9189 g | 0.9189 g | 0.9396 g | 0.9396 g | 0.9236 g | 0.9236 g |
| $RF_{XLPE,\ Std}$ | 8222.8/5.15 = 1597 | 8222.8/5.15 = 1597 | 8222.8/5.15 = 1597 | 8222.8/5.15 = 1597 | 8222.8/5.15 = 1597 | 8222.8/5.15 = 1597 |
| $RF_{XLPE,\ S}$ | 1597*0.9917/ 0.9189 = 1723 | 1597*0.9917/ 0.9189 = 1723 | 1597*0.9917/ 0.9369 = 1685 | 1597*0.9917/ 0.9369 = 1685 | 1597*0.9917/ 0.9236 = 1714 | 1597*0.9917/ 0.9236 = 1714 |
| $Conc._{XLPE,\ S}$ (ppm) | 1000*4927.3/ 1723/0.9189 = 3112 ppm | 1000*8509.3/ 1723/0.9189 = 5374 ppm | 1000*3327.6/ 1685/0.9369 = 2102 ppm | 1000*8796.4/ 1685/0.9369 = 5555 ppm | 1000*3359.0/ 1714/0.9236 = 2121 ppm | 1000*9195.2/ 1714/0.9236 = 5807 ppm |

**XLPE refers to a crosslinked plaque

5. Results and Discussion:

As previously described, DCP will decompose in curing step to generate cumyl oxyl radicals. Part of cumyl oxyl radical will go through beta scission to form AP and methyl radicals. Both cumyl oxyl radical and methyl radicals abstract hydrogen from polyethylene to initiate the crosslinking of polymer and form CA and methane. The concentration of these byproducts in a fresh cured sample is determined by DCP loading. Higher loading of DCP leads to greater byproduct concentration.

As shown in Table 3, 3000 ppm AP and 5200 ppm CA are present in the fresh cured CS-1 sample (cooled crosslinked plaque) containing 1.2% DCP and $R_{AP/CA}$ value is 0.573. We are surprisingly found that in the presence of SiH-1, SiH-2, SiH-3 and SiH-4, (i.e., in IE-1, IE-2, IE-3, IE-4 and IE-5), the $R_{AP/CA}$ value decreases, especially for IE-3 with 0.7% SiH-4 which achieves a 35.7% reduction in $R_{AP/CA}$ compared to CS-1. Bounded by no particular theory, it is believed Si radical initiated by active radicals in the system add to carbonyl group of AP and bonding onto Si—H scavenger through Si—O—C bond.

At higher DCP loading, IE-6 and 7 in Table 3, SiH-4 effectively reduces the AP. The $R_{AP/CA}$ value for IE-6 and IE-7 (0.372-0.378) is similar to IE-3 (0.369).

The additional curing coagents, like TAlC and VD4, do not impact the AP reduction as shown in IE-8 and IE-9.

TABLE 3

| | CS-1 | IE-1 | IE-2 | IE-3 | IE-4 | IE-5 | IE-6 | IE-7 | IE-8 | IE-9 |
|---|---|---|---|---|---|---|---|---|---|---|
| LDPE(DXM-446) | 98.8 | 98.3 | 98.45 | 98.1 | 98.1 | 97.9 | 97.8 | 98.2 | 97.6 | 97.6 |
| SiH-1 | | 0.5 | | | | | | | | |
| SiH-2 | | | | | 0.7 | | | | | |
| SiH-3 | | | | | | 0.9 | | | | |
| SiH-4 | | | 0.35 | 0.7 | | | 0.7 | 0.7 | 0.7 | 0.7 |
| TAIC | | | | | | | | | 0.5 | |
| VD4 | | | | | | | | | | 0.5 |
| DCP | 1.2 | 1.2 | 1.2 | 1.2 | 1.2 | 1.2 | 1.5 | 1.8 | 1.2 | 1.2 |
| Total | 100 | 100 | 100 | 100 | 100 | 100 | 100 | 100 | 100 | 100 |
| ML, dN*m | 0.27 | 0.26 | 0.23 | 0.23 | 0.23 | 0.22 | 0.27 | 0.28 | 0.23 | 0.24 |

TABLE 3-continued

| | CS-1 | IE-1 | IE-2 | IE-3 | IE-4 | IE-5 | IE-6 | IE-7 | IE-8 | IE-9 |
|---|---|---|---|---|---|---|---|---|---|---|
| MH, dN*m | 3.43 | 2.88 | 2.95 | 2.44 | 2.94 | 2.46 | 2.94 | 3.46 | 3.29 | 3.26 |
| T90, min. | 4.23 | 4.01 | 4.22 | 4.13 | 3.91 | 3.97 | 4.68 | 4.68 | 4.17 | 4.17 |
| AP, ppm | 2986 | 2681 | 2315 | 1885 | 2551 | 2233 | 2399 | 2914 | 1920 | 1970 |
| CA, ppm | 5211 | 4799 | 5270 | 5113 | 5123 | 4955 | 6453 | 7712 | 5377 | 5324 |
| $R_{AP/CA\ value}$ | 0.573 | 0.559 | 0.439 | 0.369 | 0.498 | 0.451 | 0.372 | 0.378 | 0.357 | 0.370 |
| $RiR_{AP/CA}$ | | 2.5% | 23.3% | 35.7% | 13.1% | 21.4% | 35.1% | 34.1% | 37.7% | 35.4% |

As shown in Table 3, the comparison between IE-1, IE-2, IE-3, IE-4, IE-5, IE-6, IE-7, IE-8 IE-9 each to CS-1 shows that SiH-1, SiH-2, SiH-3, SiH-4 reduces $R_{AP/CA}$ with IE-1 through IE-9 exhibiting $R_{AP/CA}$ values less than 0.57, or 0.350 to 0.559 and $RiR_{AP/CA}$ from 13% to 38% (for cooled crosslinked plaque).

TABLE 4

| | CS-2 | CS-3 | CS-4 | CS-5 | IE-10 | IE-11 | IE-12 | IE-13 |
|---|---|---|---|---|---|---|---|---|
| Polyethylene-VD4 copolymer-2 (0.15%) | 98.8 | | | | 98.1 | | | |
| Polyethylene-VD4 copolymer-3 (0.3%) | | 98.8 | | | | 98.1 | | |
| Polyethylene-VD4 copolymer-4 (0.5%) | | | 98.8 | | | | 98.1 | |
| Polyethylene-VD4 copolymer-11 (0.08%) | | | | 98.8 | | | | 98.1 |
| SiH-4 | | | | | 0.7 | 0.7 | 0.7 | 0.7 |
| DCP | 1.2 | 1.2 | 1.2 | 1.2 | 1.2 | 1.2 | 1.2 | 1.2 |
| Total | 100 | 100 | 100 | 100 | 100 | 100 | 100 | 100 |
| ML, dN*m | 0.21 | 0.2 | 0.17 | 0.17 | 0.17 | 0.15 | 0.14 | 0.15 |
| MH, dN*m | 4.06 | 4.81 | 5 | 3.83 | 2.87 | 3.41 | 3.91 | 2.69 |
| T90, min. | 4 | 3.69 | 3.57 | 4.15 | 3.94 | 3.70 | 3.47 | 4.15 |
| AP, ppm | 3088 | 3061 | 3444 | 3244 | 2113 | 2105 | 2171 | 2005 |
| CA, ppm | 5323 | 5434 | 5878 | 5753 | 5594 | 5761 | 5586 | 5763 |
| $R_{AP/CA}$ value | 0.580 | 0.573 | 0.586 | 0.574 | 0.378 | 0.365 | 0.389 | 0.348 |
| $RiR_{AP/CA}$ | | | | | 34.9% | 35.1% | 33.7% | 38.3% |

As shown in Table 4, SiH-4 achieved a $RiR_{AP/CA}$ from 34% to 39% with corresponding $R_{AP/CA}$ values from 0.340 to 0.390 (for a cooled crosslinked plaque composed of copolymer of ethylene and VD4.)

TABLE 5

| | IE-14 | IE-15 | CS-6 | CS-7 | IE-16 | IE-17 |
|---|---|---|---|---|---|---|
| LDPE 505i | 98.3 | 97.8 | 98.8 | 98.15 | 97.8 | 98.05 |
| SiH-4 | | | | | 0.35 | 0.35 |
| SiH-5 | 0.5 | 1 | | | | |
| TBM-6 | | | | 0.15 | 0.15 | 0.1 |
| DCP | 1.2 | 1.2 | 1.2 | 1.7 | 1.7 | 1 |
| TAIC | | | | | | 0.5 |
| Total | 100 | 100 | 100 | 100 | 100 | 100 |
| ML, dN*m | 0.23 | 0.2 | 0.23 | 0.17 | 0.22 | 0.18 |
| MH, dN*m | 2.93 | 2.27 | 3.12 | 3.83 | 2.92 | 3.24 |
| T90, min. | 5.06 | 5.29 | 5.184 | 4.851 | 4.8 | 4.537 |
| AP, ppm | 2673 | 2354 | 3474 | 4625 | 3880 | 2452 |
| CA, ppm | 5705 | 5756 | 6024 | 8680 | 8209 | 5140 |
| $R_{AP/CA}$ value | 0.469 | 0.409 | 0.577 | 0.533 | 0.473 | 0.477 |
| $RiR_{AP/CA}$ | 18.8% | 29.1% | | | 11.3% | 10.5% |

As shown in Table 5, the comparison between IE-14, IE-15 each to CS-6 shows that SiH-5 (which contains vinyl groups) also reduces $R_{AP/CA}$ with IE-14 and IE-15 exhibiting $R_{AP/CA}$ values from 0.400 to 0.470 and $RiR_{AP/CA}$ from 15% to 30% (for cooled crosslinked plaque).

The comparison between IE16, IE-17 each to CS-7 shows SiH-4 reduces $R_{AP/CA}$ with IE-16 and IE-17 exhibiting $R_{AP/CA}$ values from 0.470 to 0.480 and $RiR_{AP/CA}$ from 10% to 12% in the presence of antioxidant (for cooled crosslinked plaque).

TABLE 6

| | CS-8 | CS-9 | IE-18 | IE-19 |
|---|---|---|---|---|
| UPOE-1 | 98.8 | | 98.1 | |
| UPOE-2 | | 98.8 | | 98.1 |
| SiH-4 | | | 0.7 | 0.7 |
| DCP | 1.2 | 1.2 | 1.2 | 1.2 |
| Total | 100 | 100 | 100 | 100 |
| ML, dN*m | 0.08 | 0.04 | 0.08 | 0.03 |
| MH, dN*m | 11 | 6.73 | 8.02 | 4.57 |
| T90, min. | 3.889 | 3.693 | 4.061 | 3.964 |
| AP, ppm | 3418 | 3613 | 2491 | 2156 |
| CA, ppm | 5756.5 | 5794.5 | 5948 | 5764 |
| $R_{AP/CA}$ value | 0.594 | 0.624 | 0.419 | 0.374 |
| $RiR_{AP/CA}$ | | | 29.5% | 40.0% |

As shown in Table 6, SiH-4 achieves AP reduction in POE (UPOE). The comparison between IE18 and IE-19 each to CS-8 and CS-9 shows SiH-4 reduces $R_{AP/CA}$ with IE-18 and IE-19 exhibiting $R_{AP/CA}$ values from 0.370 to 0.420 and $RiR_{AP/CA}$ from 28% to 40%.

The data in Tables 3 to 6 show that SiH containing (AP) scavenger is effective to reduce acetophenone in different polymer matrix platforms and in combination with different components, such like curing coagent, and antioxidant.

It is specifically intended that the present disclosure not be limited to the embodiments and illustrations contained herein, but include modified forms of those embodiments including portions of the embodiments and combination of elements of different embodiments as come within the scope of the following claims.

The invention claimed is:

1. A process comprising:

providing an initial cable core comprising (i) a conductor, (ii) an initial insulation layer comprising a crosslinkable polymeric composition comprising (a) an ethylene-based polymer comprising (1) ethylene monomer, (2) an optional α-olefin comonomer, (3) an optional organosiloxane comonomer, (b) dicumyl peroxide (DCP), (c) an Si—H containing acetophenone (AP) scavenger, (d) optional curing coagent, and (e) optional anti-oxidant;

subjecting the initial cable core to a crosslinking procedure sufficient to crosslink the crosslinkable polymeric composition and form a cable core with a crosslinked insulation layer;

cooling the cable core with crosslinked insulation layer to ambient temperature to form a cooled cable core with a crosslinked insulation layer, wherein the cooled cable core with the crosslinked insulation layer is composition (C), and a similar composition (SC) is defined as an identical composition to (C) except (SC) does not contain component (c), the Si—H containing (AP) scavenger, wherein composition (C) has an $R_{AP/CA}$ and composition (SC) has an $R_{AP/CA}$ (SC), and composition (C) has a Reduction in $R_{AP/CA}$ that is least 2.0% greater than $R_{AP/CA}$ (SC) as determined by Formula 5

$$\text{Reduction in } R_{AP/CA}\% = [(R_{AP/CA}(C) - R_{AP/CA}(SC))/R_{AP/CA}(SC)] \times 100\%. \qquad \text{Formula 5}$$

2. The process of claim 1 wherein the crosslinking procedure forms dicumyl peroxide decomposition byproducts selected from the group consisting of cumyl alcohol (CA), acetophenone (AP), methane, alpha methyl styrene, and combinations thereof, the process comprising cooling the cable core with crosslinked insulation layer to ambient temperature to form the cooled cable core with a crosslinked insulation layer having an $R_{AP/CA}$ value less than 0.57.

3. The process of claim 2 wherein the crosslinked insulation layer of the cooled cable core has an $R_{AP/CA}$ value less than 0.57 at a time from 1 minute after the crosslinking procedure and being cooled to ambient temperature to 60 minutes after the crosslinking procedure and being cooled to ambient temperature.

4. The process of claim 1 comprising degassing, after the cooling, the cooled cable core with the crosslinked insulation layer; and reducing the amount of acetophenone in the crosslinked insulation layer to less than 1000 ppm.

5. A process comprising:

providing an initial cable core comprising (i) a conductor, (ii) an initial insulation layer comprising a crosslinkable polymeric composition comprising (a) an ethylene-based polymer comprising (1) ethylene monomer, (2) an optional α-olefin comonomer, (3) an optional organosiloxane comonomer, (b) dicumyl peroxide (DCP), (c) an Si—H containing acetophenone (AP) scavenger, (d) optional curing coagent, and (e) optional anti-oxidant;

subjecting the initial cable core to a crosslinking procedure sufficient to crosslink the crosslinkable polymeric composition and form a cable core with a crosslinked insulation layer wherein the Si—H containing (AP) scavenger is selected from the group consisting of (s1) through (s20) below (s1)

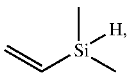

(s2)

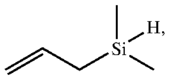

(s3)

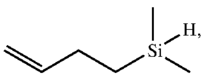

(s4)

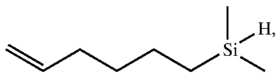

(s5)

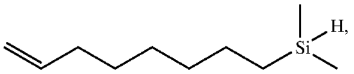

(s6)

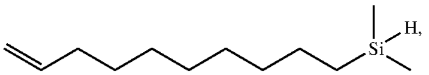

-continued (s7)

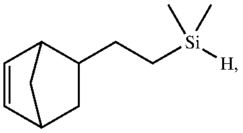

(s8)

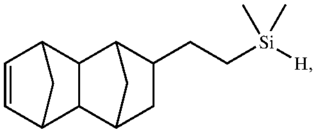

(s9)

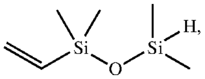

(s10)

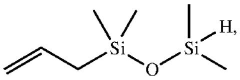

(s11)

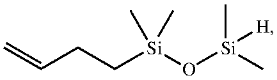

(s12)

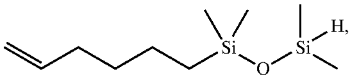

(s13)

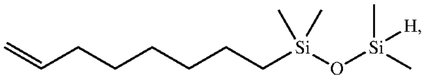

(s14)

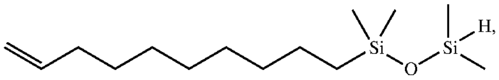

(s15)

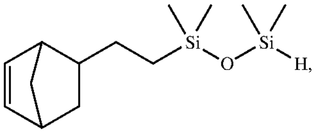

(s16)

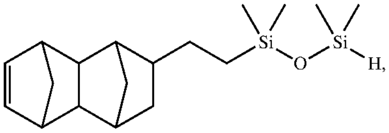

(s17)

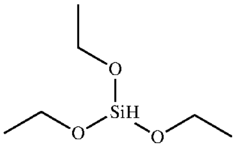

, (s18)

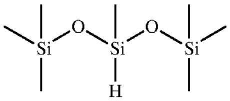

(s19)

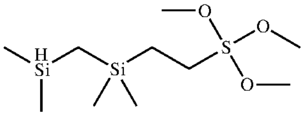

-continued (s20)

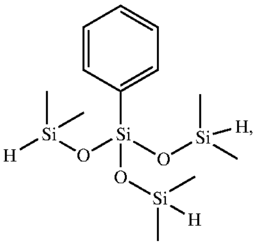

and combinations thereof.

6. A cable comprising:

a cable core comprising (i) a conductor;

(ii) a crosslinked insulation layer formed from a crosslinkable polymeric composition comprising (a) an ethylene-based polymer comprising (1) ethylene monomer, (2) an optional α-olefin comonomer, (3) an optional organosiloxane comonomer, (b) dicumyl peroxide (DCP), (c) an Si—H containing acetophenone (AP) scavenger, (d) optional curing coagent, and (e) optional anti-oxidant;

wherein the cable core is a cooled cable core comprising a crosslinked insulation layer comprising decomposition byproducts selected from the group consisting of cumyl alcohol (CA), acetophenone (AP), methane, alpha methyl styrene, and combinations thereof; and the crosslinked insulation layer of the cooled cable core has an $R_{AP/CA}$ value less than 0.57 at a time from 1 minute after the crosslinking procedure and being cooled to ambient temperature to 60 minutes after the crosslinking procedure and being cooled to ambient temperature and prior to a degassing procedure;

wherein the cooled cable core with the crosslinked insulation layer is composition (C);

a similar composition (SC) is defined as an identical composition to (C) except (SC) does not contain component (c), the Si—H containing (AP) scavenger;

composition (C) has an $R_{AP/CA}$ (C) and composition (SC) has an $R_{AP/CA}$ (SC); and composition (C) has a Reduction in $R_{AP/CA}$ that is least 2.0% greater than $R_{AP/CA}$ (SC) as determined by Formula 5

Reduction in $R_{AP/CA}$ Formula 5

$$\% = [(R_{AP/CA}(C) - R_{AP/CA}(SC)) / R_{AP/CA}(SC)] \times 100\%.$$

7. A cable comprising:

a cable core comprising (i) a conductor;

(ii) a crosslinked insulation layer formed from a crosslinkable polymeric composition comprising (a) an ethylene-based polymer comprising (1) ethylene monomer, (2) an optional α-olefin comonomer, (3) an optional organosiloxane comonomer, (b) dicumyl peroxide (DCP), (c) an Si—H containing acetophenone (AP) scavenger, (d) optional curing coagent, and (e) optional anti-oxidant;

wherein the Si—H containing (AP) scavenger is selected from the group consisting of (s1) through (s20) below (s1)

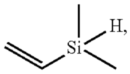

(s2)

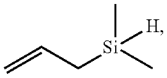

(s3)

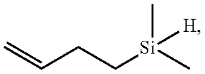

(s4)

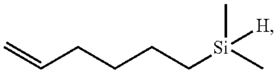

(s5)

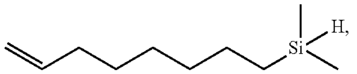

(s6)

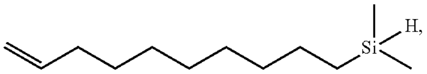

(s7)

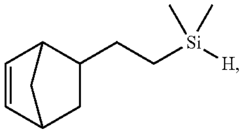

(s8)

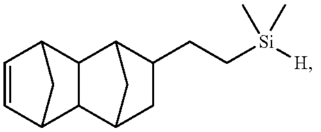

(s9)

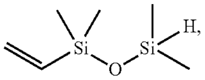

(s10)

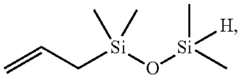

(s11)

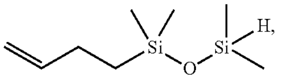

(s12)

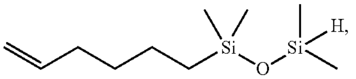

(s13)

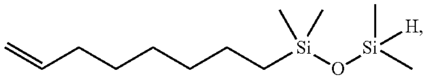

(s14)

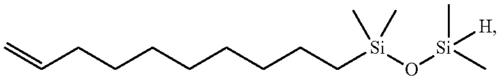

(S15)

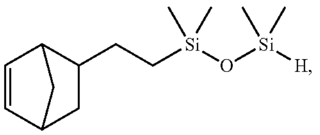

-continued (s16)

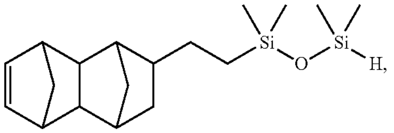

(s17)

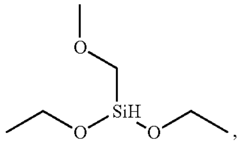

(s18)

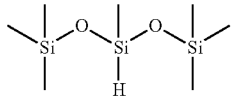

(s19)

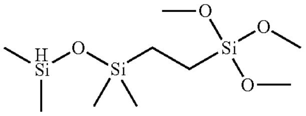

(s20)

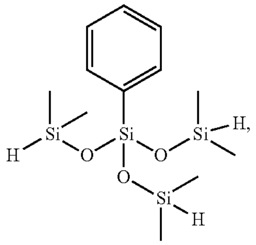

and combinations thereof.

8. The cable of claim 6 wherein the crosslinked insulation layer comprises from 95 wt % to 99.9 wt % of an ethylene homopolymer; and from 0.1 wt % to 1.0 wt % the Si—H containing (AP) scavenger.

9. The cable of claim 8 comprising from 0.1 wt % to 1.0 wt % of a curing coagent.

10. The cable of claim 6 wherein the crosslinked insulation layer comprises from 95 wt % to 99.9 wt % of an ethylene/organosiloxane copolymer; and from 0.1 wt % to 1.0 wt % the Si—H containing (AP) scavenger.

11. The cable of claim 5 comprising a first crosslinked polymeric semiconductive layer; and an optional second crosslinked polymeric semiconductive layer.

12. The process of claim 5 wherein the crosslinking procedure forms dicumyl peroxide decomposition byproducts selected from the group consisting of cumyl alcohol (CA), acetophenone (AP), methane, alpha methyl styrene, and combinations thereof, the process comprising cooling the cable core with crosslinked insulation layer to ambient temperature to form a cooled cable core with a crosslinked insulation layer having an $R_{AP/CA}$ value less than 0.57.

13. The process of claim 12 wherein the crosslinked insulation layer of the cooled cable core has an $R_{AP/CA}$ value less than 0.57 at a time from 1 minute after the crosslinking procedure and being cooled to ambient temperature to 60 minutes after the crosslinking procedure and being cooled to ambient temperature.

14. The process of claim 5 comprising degassing, after the cooling, the cooled cable core with a crosslinked insulation layer; and reducing the amount of acetophenone in the crosslinked insulation layer to less than 1000 ppm.

15. The cable of claim 7 wherein the crosslinked insulation layer comprises from 95 wt % to 99.9 wt % of an ethylene homopolymer; and from 0.1 wt % to 1.0 wt % of the Si—H containing (AP) scavenger.

16. The cable of claim 15 comprising from 0.1 wt % to 1.0 wt % of a curing coagent.

17. The cable of claim 7 wherein the crosslinked insulation layer comprises from 95 wt % to 99.9 wt % of an ethylene/organosiloxane copolymer; and from 0.1 wt % to 1.0 wt % of the Si—H containing (AP) scavenger.

* * * * *